(12) United States Patent
Schenk

(10) Patent No.: US 9,174,281 B2
(45) Date of Patent: Nov. 3, 2015

(54) POWER DRILL

(75) Inventor: Peter Schenk, Niederstotzingen (DE)

(73) Assignee: ROEHM GMBH, Sontheim (DE)

( * ) Notice: Subject to any disclaimer, the term of this patent is extended or adjusted under 35 U.S.C. 154(b) by 624 days.

(21) Appl. No.: 13/454,136

(22) Filed: Apr. 24, 2012

(65) Prior Publication Data

US 2012/0274035 A1  Nov. 1, 2012

(30) Foreign Application Priority Data

Apr. 29, 2011 (DE) .......................... 10 2011 002 331

(51) Int. Cl.
  *B23B 31/12* (2006.01)
  *B23B 31/10* (2006.01)

(52) U.S. Cl.
  CPC ......... *B23B 31/1253* (2013.01); *B23B 31/1238* (2013.01); *B23B 31/102* (2013.01); *B23B 2231/06* (2013.01); *B23B 2260/07* (2013.01); *Y10T 279/17* (2015.01); *Y10T 279/17615* (2015.01); *Y10T 279/27* (2015.01); *Y10T 279/3451* (2015.01); *Y10T 408/65* (2015.01)

(58) Field of Classification Search
  CPC ................ B23B 31/102; B23B 31/123; B23B 31/16045
  USPC ............... 279/902, 150, 147, 134, 60, 61, 62; 408/124, 238, 239 R
  See application file for complete search history.

(56) References Cited

U.S. PATENT DOCUMENTS

| | | | |
|---|---|---|---|
| 4,302,021 A | 11/1981 | Rohm | |
| 6,517,088 B1* | 2/2003 | Röhm | 279/62 |
| 7,021,400 B2* | 4/2006 | Oretti | 173/29 |
| 7,328,904 B2* | 2/2008 | Schell et al. | 279/60 |
| 7,537,421 B2* | 5/2009 | Puzio et al. | 408/124 |
| 7,588,398 B2* | 9/2009 | Puzio et al. | 408/124 |
| 7,690,658 B2* | 4/2010 | Puzio et al. | 279/60 |
| 2006/0061048 A1 | 3/2006 | Puzio et al. | |
| 2008/0185794 A1* | 8/2008 | Puzio | 279/60 |
| 2009/0200758 A1* | 8/2009 | Lam et al. | 279/62 |

FOREIGN PATENT DOCUMENTS

DE   102009026075 A   1/2001
FR        2612820 A1    9/1988

* cited by examiner

*Primary Examiner* — Eric A Gates
*Assistant Examiner* — Chwen-Wei Su
(74) *Attorney, Agent, or Firm* — Andrew Wilford

(57) ABSTRACT

A drilling apparatus has a housing, a motor in the housing, a drive spindle rotatable about an axis on the housing, a chuck body, and a plurality of jaws shiftable in the chuck body. First and second elements interconnected by a screw thread and engaged between the body and the jaws for shifting the jaws on the housing. A drive sleeve rotationally fixed to the first element is drivable by the motor.

13 Claims, 10 Drawing Sheets

POWER DRILL

FIELD OF THE INVENTION

The present invention relates to a power drill.

BACKGROUND OF THE INVENTION

A typical power drill has a motor and a drive spindle rotatably mounted in a housing, and a drilling chuck with a chuck body in which displaceable jaws are guided by a threaded connection formed between a threaded drive member and a threaded stem element.

A drilling chuck of the kind described above is disclosed in DE 10 2009 026 075 (U.S. application Ser. No. 13/302,037 filed 4 Mar. 2012). It has a housing, a tubular drive spindle extending forward along an axis from the housing, a drive motor in the housing and permanently connected to the spindle for rotating the spindle about the axis, and a chuck body carried on the spindle outside the housing. An internally threaded sleeve element is provided in the spindle, and a driver, sleeve, and holder carried on the chuck body form a plurality of angularly spaced angled guides receiving respective jaws axially rearwardly braced on the driver. A stem element on the driver is threaded into the sleeve element. A rod rotationally coupled to the one of the elements extends axially through the spindle so that relative rotation of the one element and the stem shifts the jaws in the guides. A coupling rotationally fixed to the rod is axially shiftable between a tightening position engaging the housing and a drilling position engaging the chuck body. Interfitting formations on the coupling, the housing, and the chuck body rotationally lock the one element to the rod and couple the rod to the housing in the tightening position and to the chuck body in the drilling position.

In the drilling configuration, the coupling rod is rotationally connected to the tubular drive spindle so that, in the tightening position that serves to displace the jaws, the coupling rod is decoupled from the tubular drive spindle and is rotationally connected to the housing. In doing so, the coupling rod and the threaded stem element are fixed with respect to the rotation of the tubular drive spindle driven by the motor. The tubular drive spindle is rotationally connected to the chuck body and to the jaw holder so that the threaded drive member is screwed in and out on rotation of the chuck body, and the jaws are therefore displaced by the motor of the power drill. This is a possible way of adjusting the jaws with the help of the power drill drive. In doing so however, it is difficult for a user to fit a drilling tool in the power drill between the jaws, as the chuck body, which is on the outside of the power drill and is driven by the power drill motor, rotates during the clamping process.

OBJECTS OF THE INVENTION

It is therefore an object of the present invention to provide an improved power drill.

Another object is the provision of such an improved power drill that overcomes the above-given disadvantages, in particular that also provides a progressive integration of the drilling chuck with the power drill.

SUMMARY OF THE INVENTION

With a power drill of the kind described above, the object is achieved by providing a drive sleeve that is rotationally connected to the threaded stem element and that can be driven by the motor. This has the advantage that the power drill can be produced more easily, more simply and more cheaply. In addition, the compact design of the power drill guarantees that, in the drilling configuration, rotation of the threaded drive member with respect to the threaded stem element is blocked. With the power drill according to the invention, an interlock such as is shown in EP 0 017 748 [U.S. Pat. No. 4,302,021) that is intended to prevent rotation of the chuck body relative to the parts that release the jaws is therefore no longer necessary. Furthermore, a limitation of the clamping force, such as is often provided with self-tightening drill chucks, is no longer necessary. At the same time, in the drilling configuration, the torques opposing the drilling direction acting on the drilling chuck due to the drilling tool cause no relative movement of the threaded drive member relative to the threaded stem element. Incorrect clamping of the drilling tool, which would prevent the drilling chuck from being easily released, cannot occur.

It has been shown to be useful when a gear arrangement, preferably a planetary-gear transmission, is provided between the motor and the drive sleeve. This enables the highest possible torques to be transmitted to the drive spindle and, in the drilling configuration, also to the threaded stem element.

At the same time, it is particularly beneficial when the planetary-gear transmission has a sun gear that can be driven by the motor and that engages with at least one planet gear that is mounted on a planet carrier connected to the drive sleeve, and that for its part interacts with a ring gear associated with the housing. This enables the power drill drive to be applied directly to the sun gear, as a result of which the planet carrier drives the drive sleeve by the planet gear that rolls on the nonrotating ring gear.

It has been shown to be beneficial that the threaded stem element is formed in two parts from a threaded sleeve and an axially displaceable coupling rod that is rotationally connected thereto and is guided in the drive spindle designed as a tubular drive spindle, when the coupling rod has a coupling spur gear and the tubular drive spindle has a spindle spur gear, and when the drive sleeve and possibly the gear arrangement are axially displaceably mounted in the housing. The spindle spur gear and the coupling spur gear make it very easy to produce a torque-transmitting connection between the drive sleeve and the tubular drive spindle or coupling rod.

A particular embodiment is characterized in that the drive sleeve has internal gear teeth and can reversibly be brought from a tightening position, in which the coupling spur gear is engaged with the internal gear teeth, into a drilling configuration, in which the coupling spur gear and the spindle spur gear are engaged with the internal gear teeth. In the tightening position, the spindle spur gear is also engaged with the ring gear, as a result of which the tubular drive spindle is rotationally connected to the housing and to the chuck body. This ensures that the coupling rod rotates relative to the tubular drive spindle. The power drill can very easily be switched back and forth between the tightening position and the drilling configuration by the axial displacement of the drive sleeve. Here too, rotation of the threaded drive member relative to the threaded stem element is prevented by the spur gear and the spindle spur gear being driven by the drive sleeve.

An alternative preferred embodiment of the invention is characterized in that the drive sleeve is securely connected to the coupling spur gear and can reversibly be brought from a tightening position, in which a crown gear provided on the coupling rod is not engaged with the spindle crown gear of the tubular drive spindle, into a drilling configuration, in which the crown gear is engaged with the spindle crown gear. In this case, in the tightening position, the spindle spur gear is also engaged with the ring gear, which facilitates the rotation of the coupling rod relative to the tubular drive spindle. Axial displacement of the drive sleeve produces a rotatably fixed connection between the tubular drive spindle and the coupling rod driving the threaded sleeve, as a result of which an easy changeover is provided between the drilling configuration and the tightening position.

Expediently, an adjusting sleeve, which effects on axial displacement of the gear arrangement and the drive sleeve, is associated with the housing. This enables the user to switch between the tightening position and the drilling configuration manually or even electrically. For manual displacement, it can be expedient to provide a control cam in the housing. It is also conceivable to use a changeover between the two configuration positions that is realized with a solenoid, as shown in DE 10 2009 026 075.

At the same time, it has been shown to be particularly beneficial when the adjusting sleeve has at least one adjusting element that interacts with the ring gear, as a result of which the planetary-gear transmission can be easily displaced axially by the adjusting sleeve.

It has been shown to be beneficial that a cover cap that lies axially in front of the housing and is releasably connected thereto is associated with the housing, as this prevents drilling dust or other contamination getting into sensitive parts, such as into the gear arrangement of the power drill for example.

At the same time, it is advantageous when at least one bearing, which ensures the true running accuracy of the drilling chuck and therefore of the whole power drill, is provided between the drive spindle and the housing.

A further particularly preferred embodiment is characterized in that the chuck body is designed as a chuck sleeve and has at least one chuck crown gear that lies radially inward, that a spindle rod, which can be driven by the motor and that can be brought from a tightening position in which at least one spindle rod crown gear of the spindle rod is engaged with at least one planet gear and is not engaged with the chuck crown gear into a drilling configuration in which the spindle rod crown gear is engaged with the chuck crown gear, is axially displaceably guided in the chuck body, and that the drive sleeve is in the form of a ring gear that is engaged with the planet gear. Here, only one part, namely the spindle rod, is axially displaced in order to switch back and forth between the tightening position and the drilling configuration. In so doing, the spindle rod serves as a central gear that drives the planet gear, which for its part drives the drive sleeve that is in the form of a ring gear. The threaded stem element engaged with the threaded drive members provided on the jaws is driven by the drive sleeve.

At the same time, it has been shown to be particularly beneficial when a spring is arranged between the chuck sleeve and the spindle rod and supports these axially. This causes a resetting force of the spring to act permanently on the spindle rod, as a result of which the power drill is forced into the drilling configuration.

It is also advantageous when a coaxially arranged driver ring is associated with the spindle rod. This driver ring provides an additional guide for the spindle rod. In the clamping mode, the driver ring is engaged in a rotatably fixed manner with the chuck sleeve so that it is securely held and the relative rotation of the chuck sleeve relative to the spindle rod is facilitated. The driver ring can also have external gear teeth that, in the drilling mode, engage with housing gear teeth formed on the housing.

Furthermore, it has been shown to be beneficial when an adjusting sleeve, which effects the axial displacement of the spindle rod, is associated with the housing, where here too a mechanical, electrical or manual displacement is possible.

Finally, it has been shown to be preferable when the adjusting sleeve has at least one adjusting element that interacts with the driver ring, as this ensures a guided and reliable displacement of the spindle rod.

BRIEF DESCRIPTION OF THE DRAWING

The above and other objects, features, and advantages will become more readily apparent from the following description, reference being made to the accompanying drawing in which.

DETAILED DESCRIPTION

Figure 1:
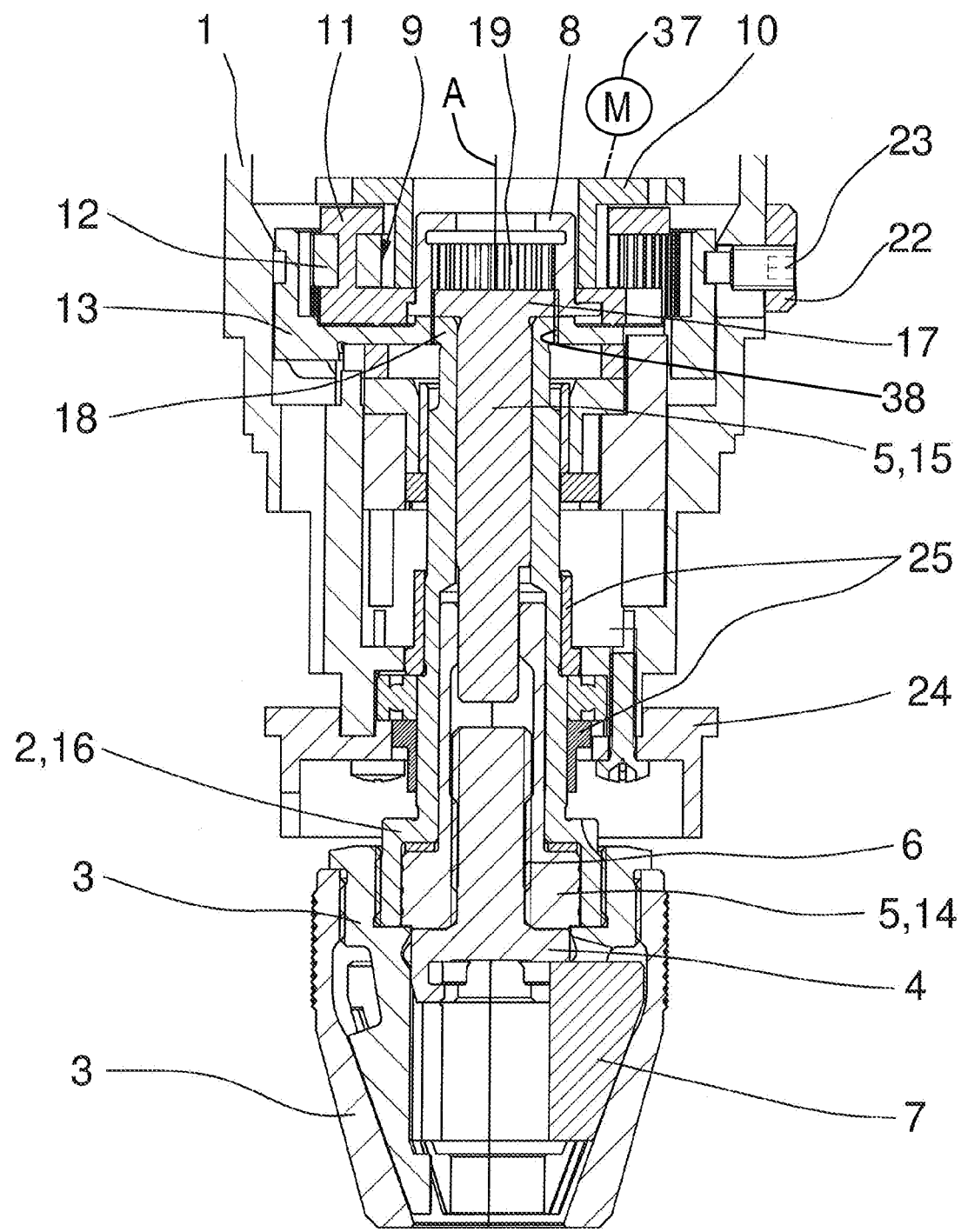
FIG. 1 is a partly schematic axial section through a first drill according to the invention, in the clamping position.
Figure 2:
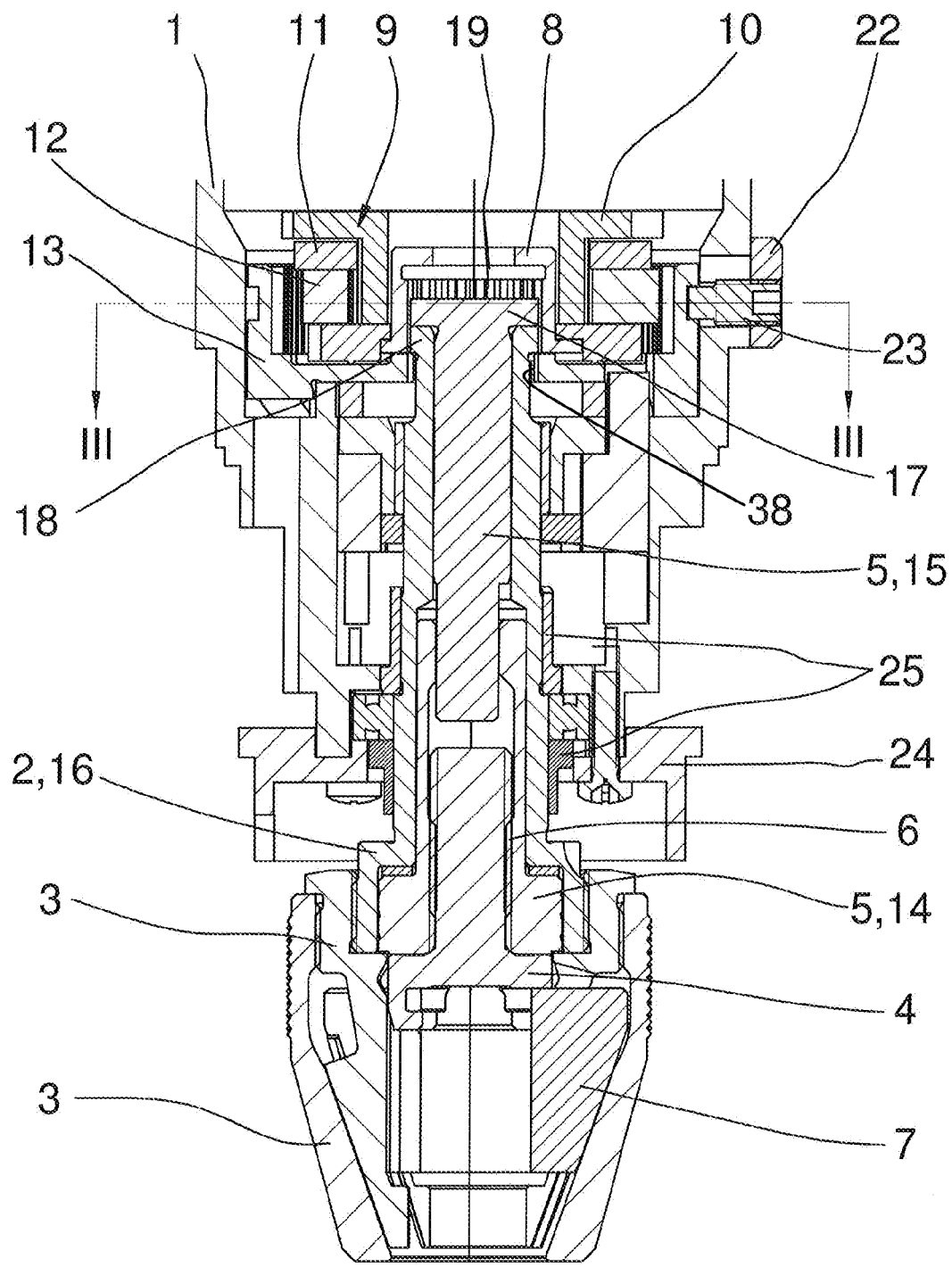
FIG. 2 is a view like FIG. 1 but in the drilling position.
Figure 3:
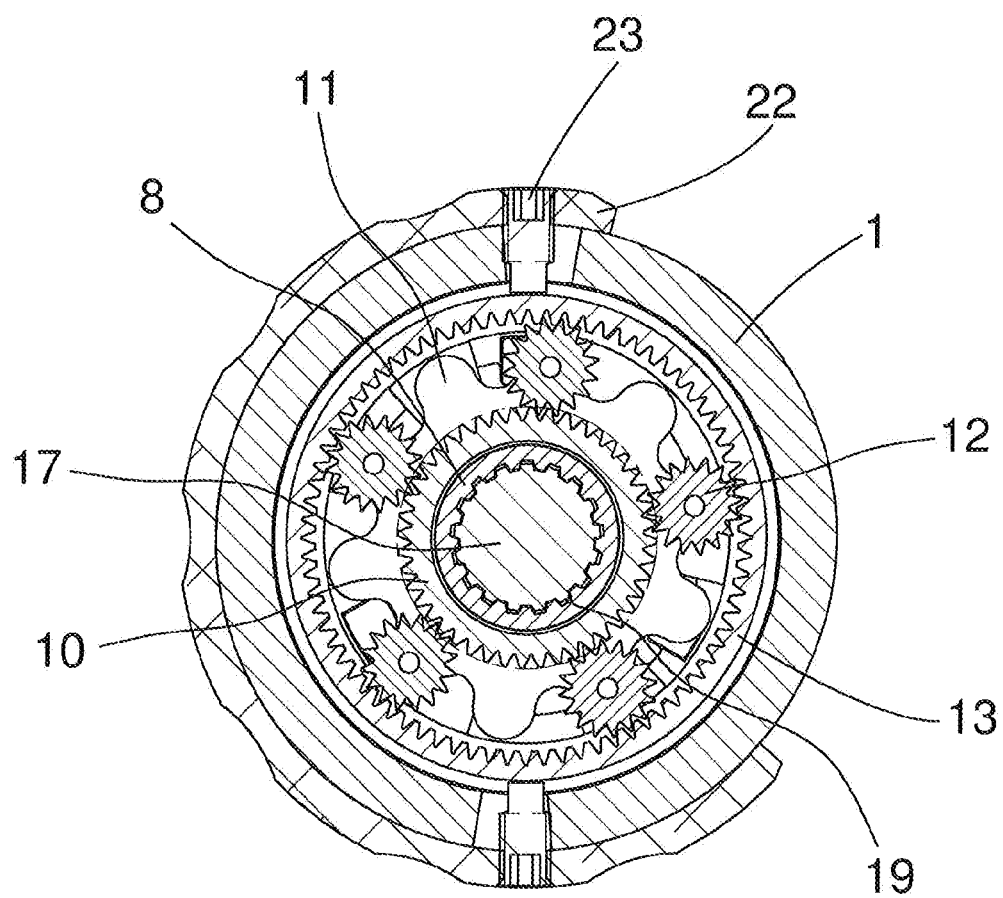
FIG. 3 is a section taken along line of FIG. 2.

As seen in FIGS. 1 to 3 a first preferred embodiment of the power drill consisting of a power drill having a motor 37 and a drive spindle 2 rotatable in a housing 1 about its axis A and fixed at its front to a chuck body 3 in which jaws 7 can be shifted axially and radially by a threaded connection 6 formed between a threaded drive member 4 and a threaded stem element 5. The jaws 7 can shift axially and radially in the chuck body 3 but cannot move angularly relative to it or to the drive member 4. On the other hand, the stem element 5 can as described below rotate relative to the chuck body 3 but not move axially or radially therein or can be rotationally fixed to the chuck body 3.

In addition as also shown in FIG. 3, a planetary-gear transmission has a sun gear 10 that is rotatable about the axis A by the motor 37, five planet gears 12 meshing radially inward with the sun gear 10 and radially outward with a ring gear 13 that is rotationally fixed on the housing 1 but as described below limitedly axially displaceable thereon. The planet gears 12 are mounted on a planet carrier 11 rotatable about the axis A and connected to a drive sleeve 8 rotationally coupled to the stem element 5.

The threaded stem element 5 is formed in two relatively nonrotatable parts from a threaded sleeve 14 and an axially displaceable coupling rod 15 both centered on and rotatable about the axis A with the rod 15 inside the sleeve 14. The sleeve 14 is connected by the screwthread 6 to the drive member 4 and is axially nondisplaceable in the chuck body 3. The sleeve 14 and rod 15 are rotationally coupled to each other, for instance by complementary polygonal cross sections. The sleeve 14 and rod 15 are rotatable in the tubular drive spindle 2 that has a radially enlarged front end 16 against which the sleeve 14 is axially rearwardly braced. The coupling rod 15 has at its rear end a coupling spur gear 17, and the tubular drive spindle 2 has end immediately thereadjacent at its rear end a similarly toothed spindle spur gear 18.

The planetary-gear transmission 9 and the drive sleeve 8 are axially displaceably relative to the housing 1, the spindle 2, the chuck body 3, and the stem element 5. An adjusting sleeve 22 is externally carried and axially shiftable on the housing 1 and is coupled to the gear transmission 9 and sleeve 8 to axially shift them relative to the housing 10. To this end, radially extending screws 23 couple the adjusting sleeve 22 to the ring gear 13.

The housing 1 is provided with a cover cap 24 axially just behind the chuck body, on the side of the power drill facing away from the motor, and releasably connected to the housing. Bearings 25 are provided between the drive spindle 2 and the housing 1.

The drive sleeve 8 is formed with an internal toothing or gear 19 complementary to the gears 17 and 18 and axially long enough to accommodate both of them. Immediately therebelow, the ring gear 13, which is axially limitedly shiftable in the housing 1 with the rest of the planetary transmission 8 but not rotatable on the housing 1, is also formed with a ring of internal teeth 38 meshable with the teeth of the gear 17. The transmission 8 and the gear teeth 19 and 38 can move axially between a rear position shown in FIG. 1 with the gear 17 meshing with the teeth 19 and the gear 18 meshing with the teeth 38, and a front position shown in FIG. 2 with both of the gears 17 and 18 meshing with the teeth 19.

In FIG. 1, the structure is shown in the tightening position in which the internal gear teeth 19 of the drive sleeve 8 is in mesh with the coupling spur gear 17 and the spindle spur gear 18 is meshed with the teeth 38 of the nonrotating ring gear 13. Here, the force of the motor 37 is transmitted as usual via a machine spindle to the sun gear 10 of the planetary-gear transmission 9. This drives the planet gears 12 mounted on the planet carrier 11 that roll on the ring gear 13 rotationally fixed to the housing 1, thereby rotating the drive sleeve 8. For its part, the drive sleeve 8, which is rotationally connected to the planet carrier 11, transmits the force to the coupling spur gear 17, as a result of which the coupling rod 15 and the threaded sleeve 14 are both rotated. As the spindle spur gear 18 and therefore the tubular drive spindle 16 are rotationally connected via the ring gear 13 to the housing 1, this enables relative rotation of the threaded sleeve 14 relative to the tubular drive spindle 16, and the threaded stem element 4 is displaced by the threaded connection 8 axially forward, i.e. in a direction away from the motor 37, or axially backward, taking with it the jaws 7. Depending on the direction of rotation of the sun gear 10, the chuck is tightened or loosened.

FIG. 2 shows the embodiment in the drilling configuration in which the drive sleeve 8 and the planetary-gear transmission 9 are moved axially forward so that the coupling spur gear 17 and the spindle spur gear 18 both mesh with the internal gear teeth 19 of the drive sleeve 8. Here too, the force of the motor is transmitted to the sun wheel 10 of the planetary-gear transmission 9. This drives the planet gears 12 mounted on the planet carrier 11 that roll on the ring gear 13 that is rotationally connected to the housing 1. Here, the drive sleeve 8 is displaced axially forward by the displacement of the adjusting sleeve 22. The drive sleeve 8 is driven by the planetary-gear transmission 9 and is now rotationally connected to the coupling rod 15 and to the tubular drive spindle 16 by engagement of the coupling spur gear 17 and the spindle spur gear 18 with the internal gear teeth 19 of the drive sleeve 8 so that the force of the motor is transmitted directly to the coupling rod 15 and the tubular drive spindle 16. This prevents relative rotation of the threaded sleeve 14 relative to the tubular drive spindle 16 and the displacement of the jaws 7.

Figure 4:
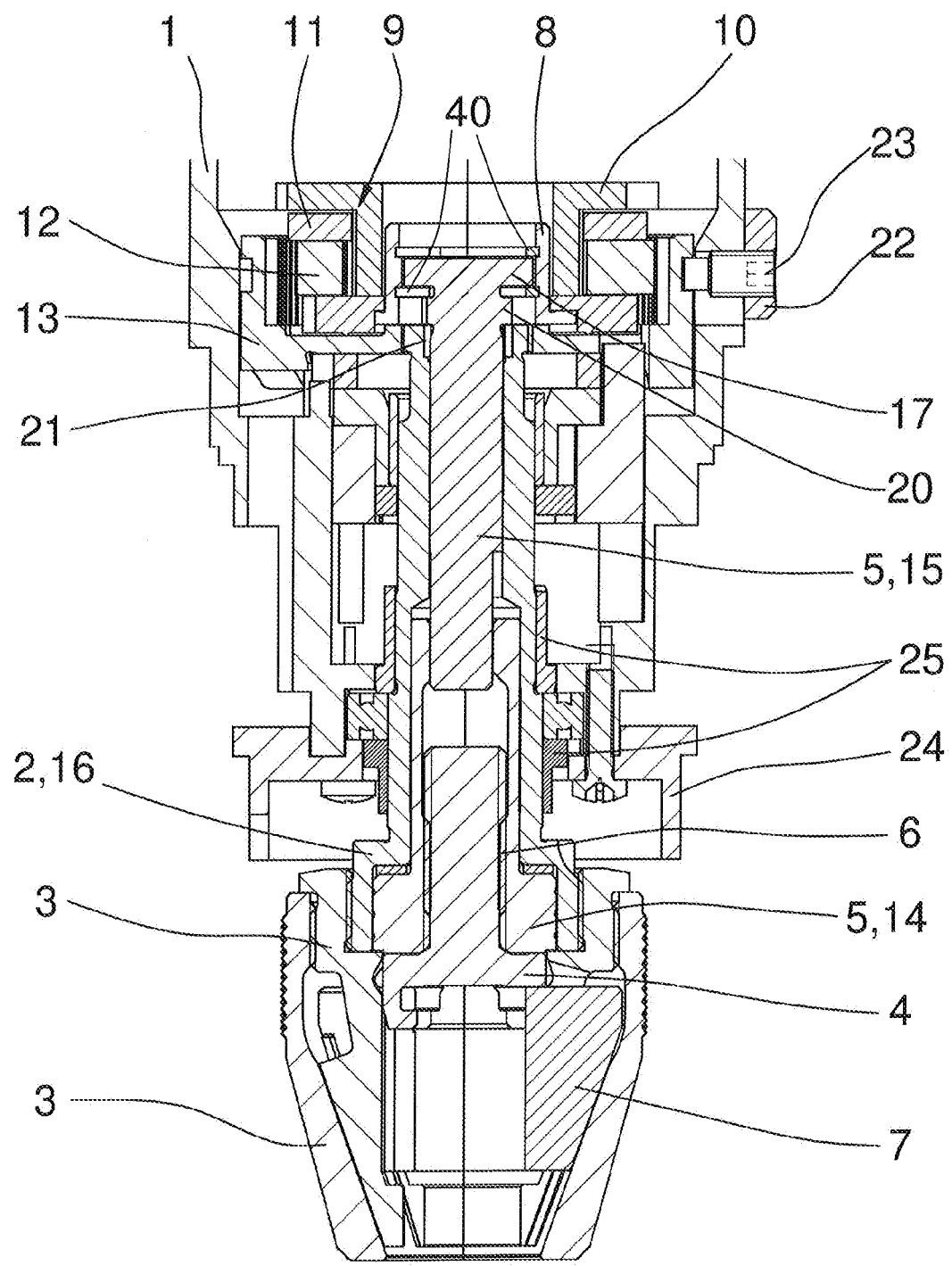
FIGS. 4 and 5 are views like respective FIGS. 1 and 2 of a second drill according to the invention.
Figure 5:
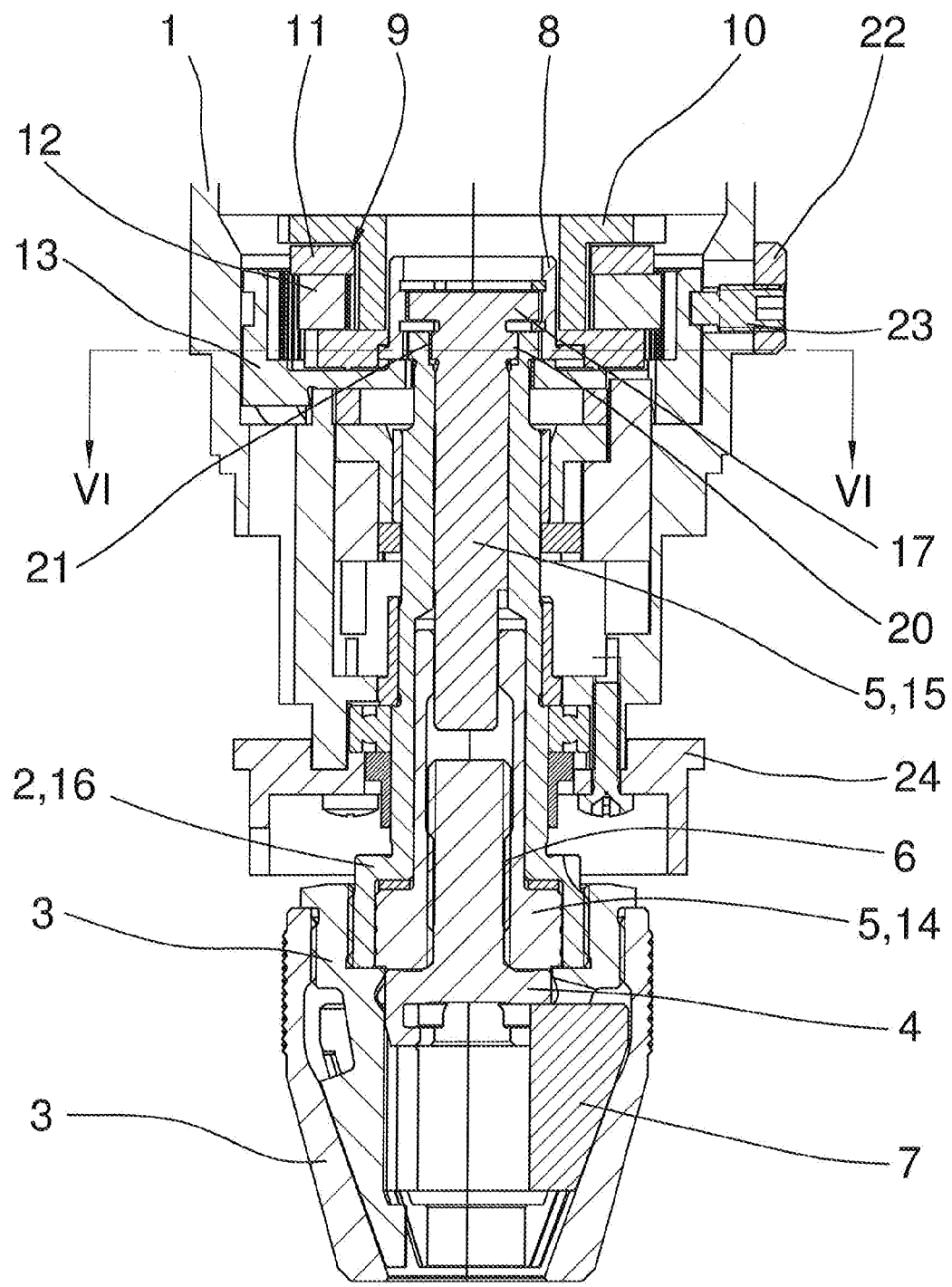
Figure 6:
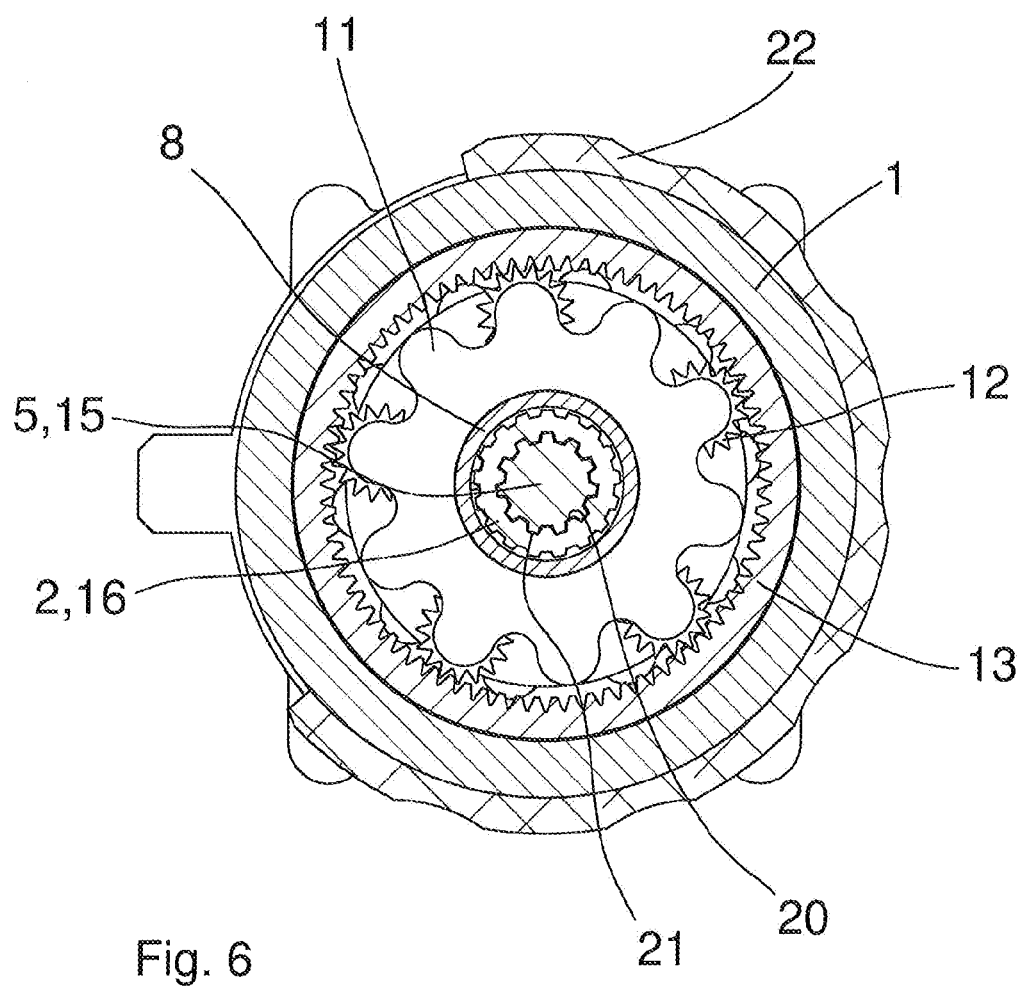
FIG. 6 is a section taken alone line VI-VI of FIG. 5.

A further preferred embodiment is shown in FIG. 4 to FIG. 6. Here, the drive sleeve 8 is fixed by snap rings 40 to the coupling spur gear 17, and the coupling rod 15 has an external crown gear 20. For its part, the tubular drive spindle 16 has an internal spindle crown gear 21.

FIG. 4 shows the embodiment in the tightening position, in which the crown gear 20 provided on the coupling rod 15 is not engaged with the spindle crown gear 21 of the tubular drive spindle 16. In this embodiment, the motor 37 rotates the sun gear 10 of the planetary-gear transmission 9 to drive the planet gears 12 mounted on the planet carrier 11 that roll on the ring gear 13 rotationally connected to the housing 1. The planet carrier 11 is rotationally connected to the drive sleeve 8 and therefore to the coupling rod 15 that as a result is driven by the motor 37, regardless of the axial position of the transmission 9 and sleeve 8. The tubular drive spindle 16 engages with the teeth 39 of the ring gear 13 that is rotationally connected to the housing 1. The adjusting sleeve 22 is displaced axially backward so that the crown gear 20 of the coupling rod 15 is not engaged with the spindle crown gear 21. As a result, only the coupling rod 15 is driven by the motor 37 and not the tubular drive spindle 16. In this tightening position, relative rotation is possible between the tubular drive spindle 16 and the threaded sleeve 14, so that, in this embodiment, the jaws 7 are also displaced by the axial displacement of the threaded drive member 4.

On the other hand, in FIG. 5, the power drill is shown in the drilling configuration where the crown gear 20 meshes with the spindle crown gear 21. In this configuration, the motor 37 rotates the sun gear 10 of the planetary-gear transmission 9 to drive the planet gears 12 that roll on the ring gear 13 rotationally connected to the housing 1. The adjusting sleeve 22 is now displaced axially forward, as a result of which the planetary-gear transmission 9 and the drive sleeve 8 with the coupling rod 15 are also displaced axially forward, and the ring gear 13 and the tubular drive spindle 16 are disengaged. In this drilling configuration, the crown gear 20 of the coupling rod 15 is engaged with the spindle crown gear 21, as a result of which the force of the motor 37 is transmitted to both the coupling rod 15 and to the tubular drive spindle 16. Relative rotation between the tubular drive spindle 16 and the threaded sleeve 14 is prevented.

FIG. 6 shows that, in this illustrated embodiment, the drive sleeve 8 also has internal gear teeth 19. In addition, the adjusting sleeve 22 does not have to fully surround the power drill.

A further preferred embodiment is shown in FIGS. 7 to FIG. 11 where the chuck body 3 is a sleeve 26 and has two axially spaced rings 27 of internal gear teeth. A spindle rod 28, which can be driven by the motor 37 and that in the illustrated embodiment has a socket 32 for a drive tool, is axially displaceably guided in the chuck body 3. In this embodiment, the drive sleeve 8 takes the place of the ring gear 13 engaged with the planet gears 12.

Figure 7:
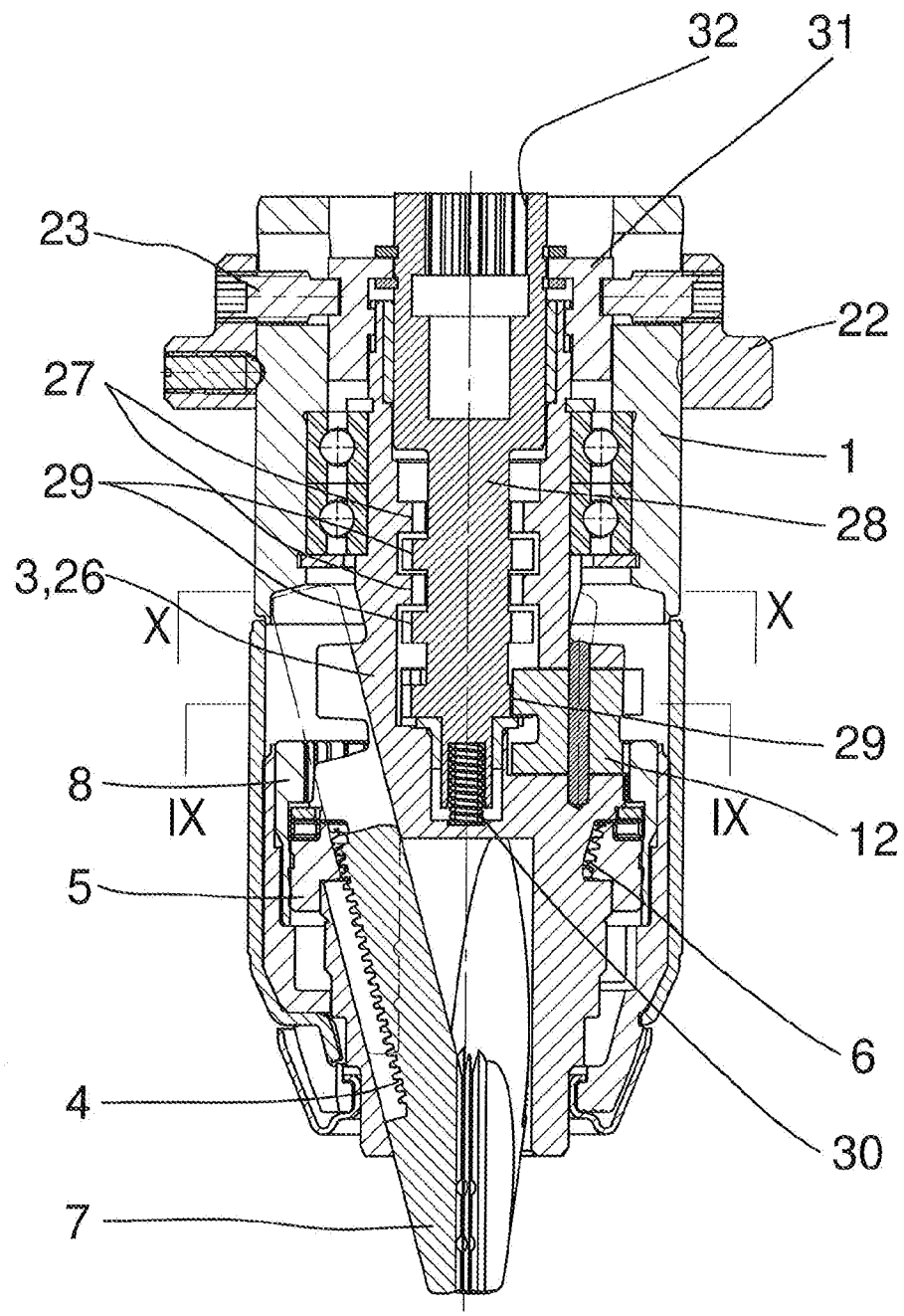
FIGS. 7 and 8 are views like respective FIGS. 1 and 2 of a third drill according to the invention.

FIG. 7 shows the power drill in the tightening position, in which a ring of crown-gear teeth 29 on the spindle rod 28 is engaged with a planet gear 12 and not engaged with the chuck crown gear 27. A spring 30 that supports the spindle rod 28 and forces the power drill into the drilling configuration is provided between the chuck sleeve 26 and the spindle rod 28. A driver ring 31 that interacts with an adjusting element 23 associated with an adjusting sleeve 22 coaxially surrounds the spindle rod 28. Usually a control cam is formed between the housing 1 and the adjusting element 23 and/or the adjusting sleeve 22, thus enabling the spindle rod 28 to be easily displaced manually.

In this embodiment, the motor 37 is directly connected to the spindle rod 28, which for its part drives the planet gears 12 that roll on the ring gear 13. The planet gears 12 are fixed in the chuck body 3 so that the ring gear 13 rotates as a result of their being driven. The ring gear 13 shown here is rotationally connected to the threaded stem element 5. The spindle crown gears 29 are not engaged with the chuck crown gears 27, thus enabling rotation of the spindle rod 28 relative to the rotatably fixed chuck body 3. In this tightening position, the threaded stem element 5 is therefore driven by the motor 37 via the connection with the ring gear 13 and the planet gears 12 to drive the ring gear 13. This enables the jaws 7 in the fixed chuck body 3 to be displaced.

Figure 8:
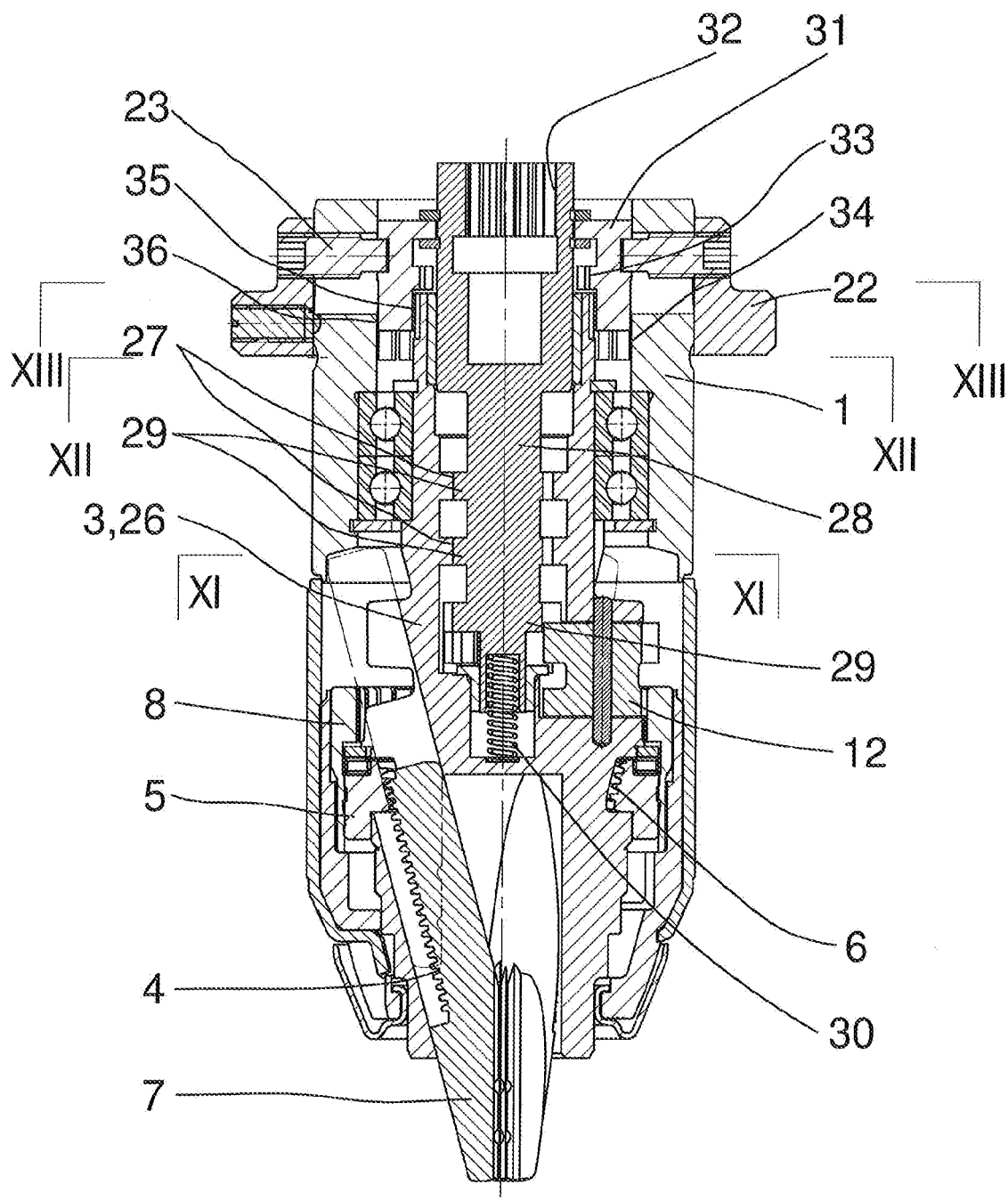

The power drill from FIG. 7 is shown in FIG. 8 in the drilling configuration where each of the spindle rod crown gears 29, two of which are provided here, is engaged with a respective one of the chuck crown gears 27. Furthermore, a bearing 25 is provided between the housing 1 and the chuck sleeve 26 in these embodiments. The spindle rod 28 is displaced axially rearward by the adjusting sleeve 22, as a result of which the motor 37 rotates the spindle rod 28 and the chuck body 3 by engagement of the chuck crown gears 27 with the spindle rod crown gears 29. In the illustrated embodiment shown, the spindle rod 28 is also rotating with the planet gears 12, which however, in this drilling configuration, for their part no longer roll on the ring gear 13 however, as the ring gear 13 and the planet gears 12 are carried along with the rotation of the chuck body 3. Rotation of the chuck body 3 relative to the threaded stem element 5, which effects the displacement of the jaws 7, is prevented.

Figure 9:
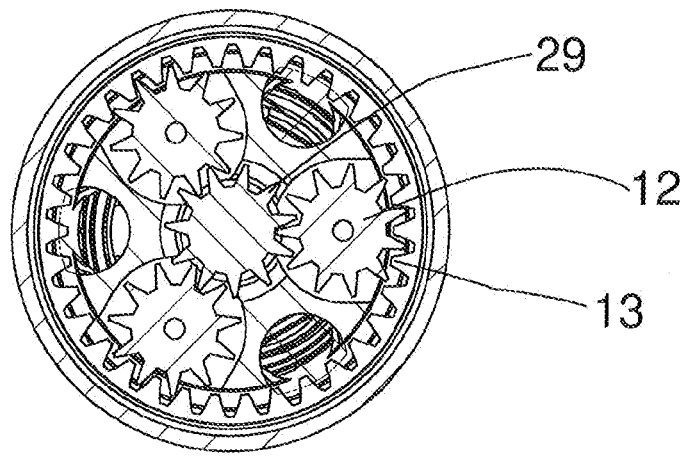
FIGS. 9 and 10 are sections taken along respective line IX-IX and X-X of FIG. 7.

FIG. 9 shows that the spindle rod crown gear 29 as sun gear 10 is engaged with a planet gear 12 that for its part is engaged with the drive sleeve 8 in the form of ring gear 13.

Figure 10:
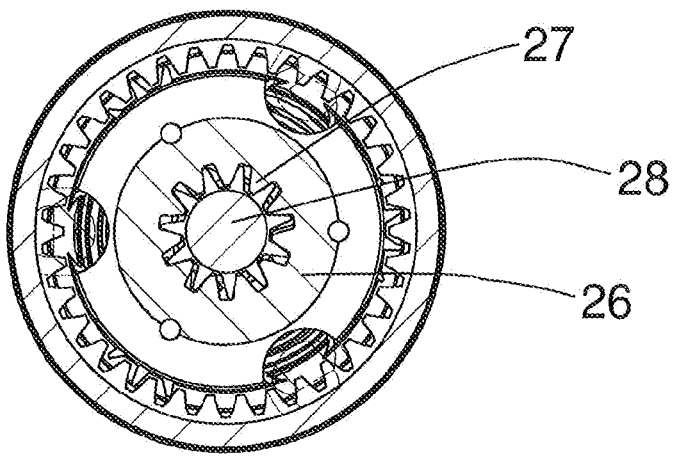

FIG. 10 shows that no part of the spindle rod 28 is engaged with the chuck crown gear 27 shown here, enabling the spindle rod 28 to be rotated relative to the chuck sleeve 26.

Figure 11:
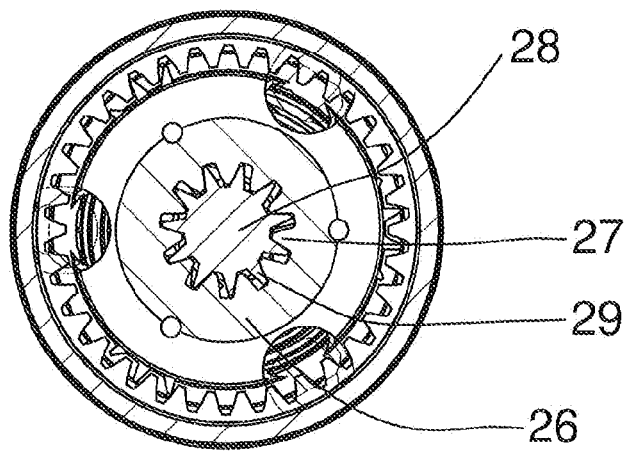
FIGS. 11, 12, and 13 are sections taken along respective lines XI-XI, XII-XII, and XIII of FIG. 8.

FIG. 11 shows that the spindle crown gear 29 is engaged with the chuck crown gear 27 and therefore, in the drilling configuration, the chuck sleeve 26 is carried along when the spindle rod 28 rotates.

Figure 12:
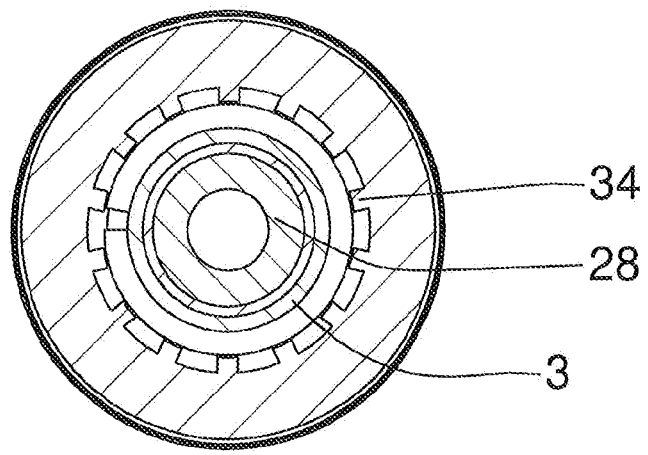
Figure 13:
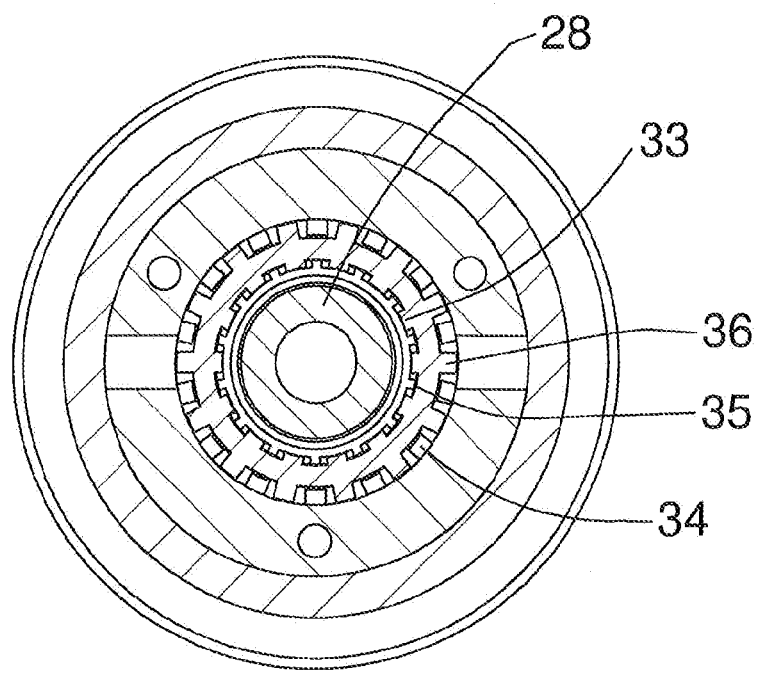

FIG. 12 shows that the driver ring 31 of the illustrated embodiment shown has a ring 33 of internal gear teeth and another ring 36 of external gear teeth. In addition, gear teeth 34 are formed on the housing 1. In the drilling configuration, the internal gear teeth 33 engage with the chuck-body teeth 35 and the external gear teeth 36 with the housing gear teeth 34. As a result, the chuck body 3 or chuck sleeve 26 is fixed. As well as gear teeth, other rotatably fixed connections between the above-mentioned parts are also conceivable.

I claim:

1. A drilling apparatus comprising:
   a housing;
   a motor in the housing;
   a transmission having an input gear drivable by the motor and an output gear;
   a tubular drive spindle rotatable about an axis on the housing;
   a chuck body rotationally fixed on the drive spindle;
   a plurality of jaws shiftable axially and radially in the chuck body;
   a coupling rod rotatable about the axis in the drive spindle;
   an internally threaded sleeve rotationally connected to the coupling rod and rotatable in the drive spindle;
   a driver rotationally fixed to the chuck body, bearing axially on the jaws and connected by a screw thread to the internally threaded sleeve for shifting the jaws on the chuck body on relative rotation of the coupling rod and drive spindle; and
   a drive sleeve rotationally fixed to the coupling rod and to the output gear so as to be drivable by the motor; and
   means connected to the output gear for moving same relative to the drive spindle between a tightening position with the drive sleeve rotationally coupled to the coupling rod but not to the drive spindle and a drilling position with the drive sleeve rotationally coupled to both the coupling rod and the drive spindle, whereby in the tightening position the motor only rotates the coupling rod and threaded sleeve to axially shift the driver and jaws relative to the chuck body and in the drilling position the motor rotates the coupling rod, threaded sleeve, driver, drive spindle, and jaws together.

2. The drilling apparatus defined in claim 1, wherein the transmission is a planetary-gear transmission between the motor and the drive sleeve.

3. The drilling apparatus defined in claim 2, wherein the planetary transmission includes a sun gear driven by the motor, a planet carrier rotationally permanently coupled to the drive sleeve and carrying at least one planet gear meshing with the sun gear, and a ring gear rotationally fixed on the housing and also meshing with the planet gear.

4. The drilling apparatus defined in claim 2, wherein the coupling rod and the drive spindle each have an array of external gear teeth, the drive sleeve being axially shiftable in the housing and connected to the means for moving between the tightening position in which the drive sleeve meshes only with the coupling rod and the drilling position in which the drive sleeve meshes with both the coupling rod and the drive spindle.

5. The drilling apparatus defined in claim 4, wherein the drive sleeve has internal gear teeth complementary with the teeth of the rod and drive spindle in the drilling position and fittable therewith for rotationally coupling the rod and drive spindle both to the drive sleeve.

6. The drilling apparatus defined in claim 4 wherein the drive sleeve is axially coupled to the teeth of the coupling rod and being rotationally coupled thereto, the rod being formed with a second array of external gear teeth fittable in a drilling configuration with teeth of the drive spindle and being disengaged from the teeth of the drive spindle in a tightening configuration.

7. The drilling apparatus defined in claim 4, wherein the means includes an adjustment ring for axially shifting the transmission and the drive sleeve.

8. The drilling apparatus defined in claim 7, wherein the adjustment ring is outside the housing and is provided with a connector extending into the housing and connected with the drive sleeve.

9. The drilling apparatus defined in claim 4, further comprising a removable cap between the chuck body and the housing and surrounding the drive spindle.

10. The drilling apparatus defined in claim 1, further comprising bearings between the housing and the drive spindle.

11. A drilling apparatus comprising:
    a housing;
    a tubular drive spindle extending forward along an axis from the housing;
    a drive sleeve rotatable in the housing about the axis and axially shiftable between a tightening end position and a drilling end position;
    a drive motor in the housing and connected to the drive sleeve for rotating the sleeve about the axis;
    a chuck body carried on the spindle outside the housing;
    an internally threaded sleeve centered on the axis inside the drive sleeve;
    a driver having a rearwardly directed stem threaded into the internally threaded sleeve;
    respective jaws shiftable in the chuck body and axially rearwardly braced on the driver;

a coupling rod rotationally coupled to the internally threaded sleeve and to the drive sleeve, whereby relative rotation of the internally threaded sleeve and the stem shifts the jaws in the chuck body;

first formations on the internally threaded sleeve and on the coupling rod and drive sleeve interengageable in the drilling end position to rotationally couple the drive spindle and coupling rod to the drive sleeve and in the tightening end position to rotationally couple the internally threaded sleeve to the drive sleeve; and second formations on the drive spindle and on a ring gear of the housing interengageable in the tightening position for rotationally coupling the drive spindle to the housing.

12. The drilling apparatus defined in claim 11, wherein the first formations include an array of radially outwardly directed teeth on the coupling rod and a complementary array of radially inwardly directed teeth on the drive sleeve, the drive sleeve being axially shiftable on the housing and relative to the coupling rod.

13. The drilling apparatus defined in claim 11, wherein the rod is axially coupled to the drive sleeve, the first formations including an array of radially outwardly projecting teeth on the rod and a complementary array of radially inwardly projecting teeth on the drive sleeve.

\* \* \* \* \*